US 9,894,256 B2

(12) United States Patent
Liberatore et al.

(10) Patent No.: US 9,894,256 B2
(45) Date of Patent: Feb. 13, 2018

(54) ILLUMINATOR FOR AN IMAGE ACQUISITION SYSTEM

(71) Applicant: DATALOGIC IP TECH S.R.L., Lippo di Calderara di Reno (IT)

(72) Inventors: Silvio Liberatore, Pescara (IT); Luigi Pellegrino, Nardò (IT); Marco Bassani, Lugo (IT)

(73) Assignee: DATALOGIC IP TECH S.R.L., Calderara di Reno (Bologna) (IT)

( * ) Notice: Subject to any disclaimer, the term of this patent is extended or adjusted under 35 U.S.C. 154(b) by 228 days.

(21) Appl. No.: 14/359,173

(22) PCT Filed: Nov. 20, 2012

(86) PCT No.: PCT/IB2012/056571
§ 371 (c)(1),
(2) Date: May 19, 2014

(87) PCT Pub. No.: WO2013/176651
PCT Pub. Date: May 30, 2013

(65) Prior Publication Data
US 2014/0340571 A1 Nov. 20, 2014

(30) Foreign Application Priority Data

Nov. 21, 2011 (IT) .............. MO2011A0299
Nov. 21, 2011 (IT) .............. MO2011A0300

(51) Int. Cl.
*H04N 5/222* (2006.01)
*H04N 5/225* (2006.01)
(Continued)

(52) U.S. Cl.
CPC .......... *H04N 5/2256* (2013.01); *F21V 17/10* (2013.01); *G06K 7/10732* (2013.01); *H04N 5/2254* (2013.01)

(58) Field of Classification Search
CPC .............. H04N 5/2256; H04N 5/2354; G03B 2215/05–2215/0596;
(Continued)

(56) References Cited

U.S. PATENT DOCUMENTS 5,202,720 A 4/1993 Fujino et al.
5,837,985 A 11/1998 Karpen
(Continued)

FOREIGN PATENT DOCUMENTS

CN 101366044 A 2/2009
EP 1371010 B1 8/2008
(Continued)

OTHER PUBLICATIONS

International Search Report and Written Opinion mailed Jan. 2, 2014 in corresponding PCT Application No. PCT/IB2012/056571.
(Continued)

*Primary Examiner* — Daniel M Pasiewicz
*Assistant Examiner* — Selam Gebriel
(74) *Attorney, Agent, or Firm* — Duane Morris LLP

(57) ABSTRACT

An illuminator includes: a body with an opening, for receiving optical means; illuminating means arranged around the opening in a frontal face of this body and commandable to illuminate a space in front of the frontal face, electronic control means of the illuminator; heat dissipating means; connecting means for removably fixing the illuminator at least to the optical apparatus. The body of the illuminator includes a rear face opposite the frontal face which includes a plurality of distinct functional case elements positioned around the opening for receiving at least the electronic control means and/or which defines the heat dissipating means and/or the connecting means, in such a manner as to enable an operator, when the optical apparatus is associated with the illuminator, to access the optical means to dismantle
(Continued)

the optical means from the apparatus and/or adjust optical adjusting means of the optical means.

39 Claims, 7 Drawing Sheets

(51) Int. Cl.
    *G06K 7/10* (2006.01)
    *F21V 17/10* (2006.01)

(58) Field of Classification Search
    CPC ..... G03B 15/02–15/07; F21V 33/0052; G01N 21/8806–21/8848; G06T 2207/10152; G06K 2209/401; G06K 9/2027
    See application file for complete search history.

(56) References Cited

U.S. PATENT DOCUMENTS

| | | | |
|---|---|---|---|
| 6,123,263 A | 9/2000 | Feng | |
| 7,136,582 B2 | 11/2006 | Hayami et al. | |
| 7,877,003 B2 | 1/2011 | Dunn et al. | |
| 8,276,819 B2 | 10/2012 | Canini et al. | |
| 2003/0029917 A1* | 2/2003 | Hennick | G06K 7/10732 235/454 |
| 2003/0184740 A1* | 10/2003 | Paradis | G01N 21/8806 356/237.1 |
| 2004/0232310 A1* | 11/2004 | Emery | G01J 1/4214 250/205 |
| 2005/0174571 A1* | 8/2005 | Cochran | G01N 21/8806 356/240.1 |
| 2005/0231948 A1 | 10/2005 | Pohlert et al. | |
| 2009/0258684 A1* | 10/2009 | Missotten | A01D 41/127 460/5 |
| 2009/0277963 A1 | 11/2009 | Kerkhoven et al. | |
| 2011/0068174 A1 | 3/2011 | Miyoshi et al. | |
| 2012/0038821 A1* | 2/2012 | Gannon | G06K 7/10722 348/373 |
| 2014/0098225 A1* | 4/2014 | Rodriguez | G03B 15/03 348/143 |

FOREIGN PATENT DOCUMENTS

| | | |
|---|---|---|
| JP | H02204732 A | 8/1991 |
| JP | 2000-357189 A | 12/2000 |
| JP | 2002-207236 A | 7/2002 |
| JP | 2003-240721 A | 8/2003 |
| JP | 2005-077468 A | 3/2005 |
| JP | 2007-017712 A | 1/2007 |
| JP | 2007-188516 A | 7/2007 |
| JP | 2010-532674 A | 10/2010 |
| WO | 2008156823 A1 | 12/2008 |
| WO | WO2009135298 A1 | 11/2009 |

OTHER PUBLICATIONS

Japanese Patent Office, Office Action dated Jul. 26, 2016 in corresponding Japanese Patent Application No. 2014-541809, including English translation.

Chinese Patent Office, Office Action dated Mar. 2, 2016 in corresponding Chinese Patent Application No. 2012800572781, including English translation.

* cited by examiner

ILLUMINATOR FOR AN IMAGE ACQUISITION SYSTEM

BACKGROUND AND SUMMARY OF THE INVENTION

The invention relates to an illuminator for an image acquisition system, in particular for acquiring images comprising optical information.

Image acquisition systems are known comprising "an optical apparatus for acquiring images" and an "illuminator", associated with this optical apparatus, for acquiring images of an object arranged on a supporting surface and processing these images to extract "optical information" from these images.

In particular, for acquisition systems of fixed type, the optical apparatus and the illuminator are connected to a supporting base, the position of which does not vary during operation of the optical apparatus.

Acquisition systems of this type are made for use without human action ("unattended systems"), to acquire images of objects that can be in transit on a conveyor belt (or other movement means) in certain production plants or package sorting centres, or can be arranged manually by an operator in a preset workstation dedicated to acquisition, in other productive, or conveying and logistic applications.

Such acquisition systems are usually located from 0.3 to 3 meters from the plane of the image to be acquired and can be positioned with the optical apparatus facing downwards to acquire images from above or horizontally to acquire images frontally and are used advantageously, for example, in production plants for automatic identification for the purposes of tracing and sorting products (for example tyres) during the various processing steps, for measuring without contact, selecting and orienting industrial items, inspecting materials for the purpose of identifying defects or for dimensional checks, monitoring, biometric recognition and checking accesses. If the apparatus faces downwards, for acquisitions from above, the optical apparatus is often much higher then an operator.

The expression "optical apparatus for acquiring images" refers to an optoelectronic apparatus for acquiring images that is able to acquire images of an object, and in particular to process these images in such a manner as to extract from them the geometrical and/or shape features of the object (for example distance, volume, overall dimensions of the object), or comprising optical information, associated with this object. The expression "optical information" means any graphic representation that constitutes information, whether coded or uncoded.

One example of coded information is an optical, linear or two-dimensional code, in which the data are coded identifying the object with which the optical code is associated. The information is coded by suitable combinations of elements of a preset shape, for example squares, rectangles or hexagons, of a dark colour (normally black) separated by light elements (spaces that are normally white), and barcodes, stacked codes and two-dimensional codes in general, colour codes, etc, are known.

The term "optical information" further comprises, more in general, also other graphic shapes, which included printed or handwritten characters (letters, numbers, etc) and particular shapes (so-called "patterns"), such as, for example, stamps, logos, signatures, finger prints, etc and any graphic representation that is detectable not only in the field of visible light but also along the entire wavelength comprised between infrared and ultraviolet.

The optical apparatus comprises a body on which an electronic sensor is arranged, for example an array of photosensitive elements of linear or matrix type for example of the CCD or CMOS type, and suitable optical receiving means fixed removably to the body, for example with a "C-Mount" consisting of one or more lenses, by means of which the sensor is suitable for receiving the diffused light from the object to be acquired.

The optical apparatus further comprises a control device, for commanding the acquisition of the image and switching on of the illuminator, as will be illustrated better below, and for processing the acquired image in order to extract the feature of interest from the image and/or decode a piece of acquired coded information. Optical apparatuses of this type are known as linear or matrix cameras, and in the case of acquiring images comprising optical information, these optical apparatuses are also known as "imagers" or "smart cameras".

"Field of view" is to be understood as an acquisition field of the optical apparatus, i.e. a preset area inside which the images of the object can be acquired, which is located within a focusing range and for which, along the optical axis of the optical means, it is possible to define a depth of field. It is observed that for acquisition systems of fixed type the optical apparatus usually comprises manually adjusted and fixed-focus optical means, in the sense that focusing and adjusting the aperture of the diaphragm can be achieved by operator only by means of adjusting ring nuts with which the optical means is provided. The illuminator comprises illuminating means comprising a plurality of single electronically controllable light emitters, and i.e. a plurality of LEDs (light emitting diodes), which are typically arranged around the optical means of the optical apparatus, to illuminate appropriately the object the image of which is to be acquired.

In particular, the illuminator has to illuminate the entire acquisition field of view of the optical apparatus with which it is associated, in all the corresponding depth of field.

The illuminator is typically activated by the control device of the optical apparatus with which it is associated and with which it is electrically connected. For example, a digital signal can be provided of a dedicated contact of the connector means interface arranged between the illuminator and the optical apparatus which, normally at a low logic value, can switch to a high logic value when the control device of the optical apparatus intends to switch on the illuminator.

The illuminator and the optical acquisition apparatus can in this manner be activated by the control device at a preset frequency, if the image acquisition method requires images to be acquired continuously, or, alternatively, the illuminator can be activated only when one or more presence sensors detect the presence of the object in the field of view of the optical acquisition apparatus or, in another alternative configuration, when an object is identified in the field of view following the analysis of the contents of a first series of images acquired preliminarily with the illuminator switched off.

Over time, as the production technology of the CCD or CMOS has become increasingly refined and in other words the number of pixels of the image sensors with which it is possible to equip the optical apparatus has increased, the field of view and the depth of field of the optical apparatus have become increasingly extended and it has therefore become necessary to increase the power of the illuminator to prevent the optical apparatus acquiring poorly lighted images from which it is difficult to extract the optical information.

To increase this lighting power, increasing the number of LEDs with which the illuminator is equipped is known. This increase in the number of LEDs nevertheless raises the question of the dissipation of heat produced by the LEDs during operation, the LEDs being at risk of damage from a possible increase in the operating temperature or the working life of the LEDs may be significantly reduced if the operating temperature is high.

An increasingly appreciated and therefore even more important requirement for an image acquisition system for industrial applications is that it has minimal overall dimensions when the optical apparatus and the illuminator are associated. A configuration with minimal overall dimensions is a configuration in which in the direction parallel to the optical axis the dimension of the acquisition system is about equal to that of the optical apparatus and in which on the plane perpendicular to the optical axis the overall dimensions are near those of the area occupied by the optical means and by the illuminating means. In other words, the acquisition system has to be as compact as possible and of small overall dimensions.

Thus, in order to maintain compact overall dimensions of the image acquisition system, whilst at the same time ensuring suitable dissipation of the heat produced by the LEDs of the illuminator, image acquisition systems are known comprising a single integrated housing containing both the optical apparatus and the illuminator, having a frontal face provided with lighting LEDs. These LEDs can be arranged in a ring around an opening of a front wall of the frontal face of the illuminator, inside which the optical means is received, or they can be arranged symmetrically on a side opposite this opening, if the housing of the acquisition system is shaped and has a frontal face of rectangular shape. In order to ensure that the image acquisition system is compact, the end of the optical means is substantially coplanar with the frontal wall on which the illuminating LEDs are arranged.

Further, ring illuminators are known that have a separate housing from the housing of the optical apparatus and can be adapted to optical apparatuses of different type. Such illuminators comprise a housing with external and internal tubular coaxial elements and the internal tubular element is typically suitable for receiving internally, when the illuminator is associated with the optical apparatus, the optical means of the apparatus. The housing of the illuminator is so shaped as to receive the optical means of the optical apparatus, in such a manner as to surround the housing of the apparatus without constituting a further overall dimension. The frontal face of the illuminator is shaped as a circular crown delimited respectively by the external and internal tubular element, substantially coplanar with the end of the optical means.

One drawback of the known illuminators disclosed above is that they do not permit rapid access to the optical means, when they are associated with the optical apparatus in the minimal overall dimensions configuration, inasmuch as the illuminators surround the optical apparatus completely.

If an operator has to replace the optical means installed in an acquisition system located in the definitive work position with others of another type, or has to adjust focussing or the diaphragm for the depth of field of such optical means, it is necessary to dismantle the illuminator from the optical apparatus. If the optical apparatus and the illuminator have different housings, it is sufficient for only the illuminator to be dismantled from the apparatus. On the other hand, it there is a single integrated housing both for the optical apparatus and for the illuminator, the entire acquisition system has to be dismantled. Nevertheless, in both cases, this dismantling is long and adjustment is difficult, so preferably this adjusting is executed on a specific test bench, if possibly a laboratory and specialised technicians are available. The acquisition system is again located in its acquisition position only at the end of adjusting and only when perfectly functioning, for example at the new focusing distance.

Another drawback of the acquisition systems illustrated so far is that adjusting the optical apparatus requires the present of a dedicated screen at the disposal of the operator.

In fact, in addition to the difficulty of access to the optical means due to the presence of the housing of the illuminator and/or of the optical apparatus, adjusting focusing and the conditions for correct acquisition of images cannot be performed with the necessary precision without the help of a dedicated consultation screen for the operator (for example a screen of a user interface device). In fact, sample images have to be acquired by the optical apparatus, the images have to be displayed on the consultation screen and the images have to be controlled by the operator, who has to decide when to terminate the focusing adjustment because the acquired sample image is clear.

In other known solutions, in order to guide the actions of the operator, on the consultation screen, together with the acquired images, or alternatively to them, some indexes are shown that measure focusing quality. These indexes are calculated by the image acquisition and processing apparatus.

The presence of the consultation screen, which shows the operator the acquired images and/or the focusing quality indexes it is therefore necessary to adjust the focus of the optical means of the apparatus.

In addition, after adjusting focusing, the operator must be able to check also other acquisition conditions, i.e. the operator has to be able to check that the coded information in the acquired image is correctly decodeable by the optical apparatus in such a manner as to otherwise vary other parameters of the optical apparatus and/or of the illuminator.

In some already known image acquisition systems, it is observed that the optical apparatus comprises visual status indicating means in the form of status LEDs arranged in the body of the optical apparatus and one or more pushbuttons associated therewith. By means of the pushbutton/pushbuttons and by checking the visual status indicating means, the optical apparatus is configurable in an initial step of setting the operating parameters of the apparatus, also without the help of an additional consulting screen. Nevertheless, if the optical apparatus is associated with an illuminator with a very bulky frontal face these status LEDs, which are used as visual status indicating means and/or as reading outcome indicating means during adjustment of focusing and in a work step of the optical apparatus, are nevertheless difficult for an operator to see. If the acquisition system is located in its acquisition position high up, at about 0.5-2 meters from the operator, the status LEDs of the optical apparatus are not visible because they are obscured by the presence of the lighting system.

The compactness constraint of the acquisition system would also make unusable, if applicable, visual indicating means of reading outcome that is typical of portable coded information devices if they were integrated into the optical apparatus of the image acquisition system. Such indicating devices, in fact, which are displayable as for example a green or red light beam projected to the acquisition plane, should be located on the sides of the optical means and would thus impose wide opening in the front wall of the body of the illuminator, of a dimension certainly greater than the minimum necessary for receiving the optical means. This would increase the overall dimensions of the illuminator and thus of the image acquisition system.

The distance at which the acquisition system is installed also raises a further problem in addition to those listed so far inasmuch as the acquisition area of the optical apparatus and thus the field of view can be difficult for an operator to delimit. This entails consequent lengthening of the time required to successfully process each single image as the acquired image can also comprise only part of the coded information unless it is correctly framed. The acquisition of the image would thus have to be repeated. This results in further extension of total adjusting time and configuration time of the acquisition system and becomes a critical element for image acquisition systems in which an object is arranged manually by an operator in a preset position dedicated to acquisition. Although this workstation is marked for the operator the absence of indications coming from the acquisition system on the position of the field of view can require a very long time for obtaining a successfully processed image.

One object of the invention is to overcome the drawbacks of known illuminators for image acquisition systems.

A further object is to provide an illuminator that, when it is associated with the optical apparatus, permits easy access to adjust the optical means of the optical apparatus, in particular easy access to the focusing ring nut and to the ring nut for adjusting the diaphragm aperture.

Another object is to provide a different type of illuminator that improves the installation, use and maintenance of an acquisition system, avoiding involving the operator in lengthy acquisition system configuration and adjusting, if the optical means of the optical apparatus have to be replaced and/or adjusted after the optical apparatus has already been associated with the illuminator.

Still another object is to provide a different type of illuminator that improves the indications to an operator in the case of acquisition systems with a fixed workstation and operator, who conveys to this workstation the object the image of which has to be acquired.

These objects and still others are all achieved by an illuminator for an image acquisition system as defined according to one or more of the claims set out below.

BRIEF DESCRIPTION OF THE DRAWINGS

The invention can be better understood and implemented with reference to the attached drawings that show an embodiment thereof by way of non-limiting example, in which.

DETAILED DESCRIPTION

Figure 1:
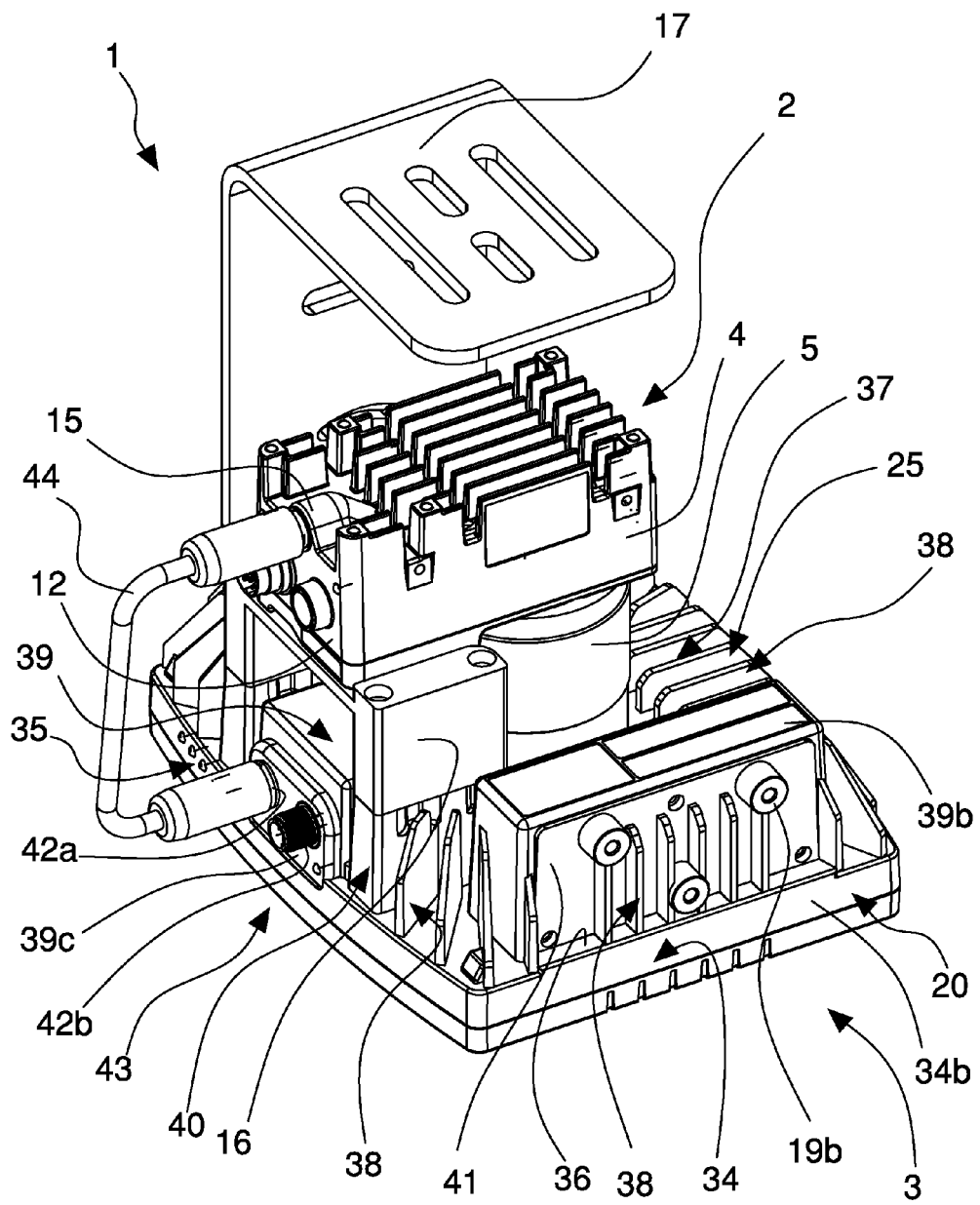
FIG. 1 shows a perspective view on the side of the connectors of the image acquisition system comprising an optical apparatus and an illuminator, connected by a communication cable and in which a bracket connecting to an external point of attachment is shown.
Figure 2:
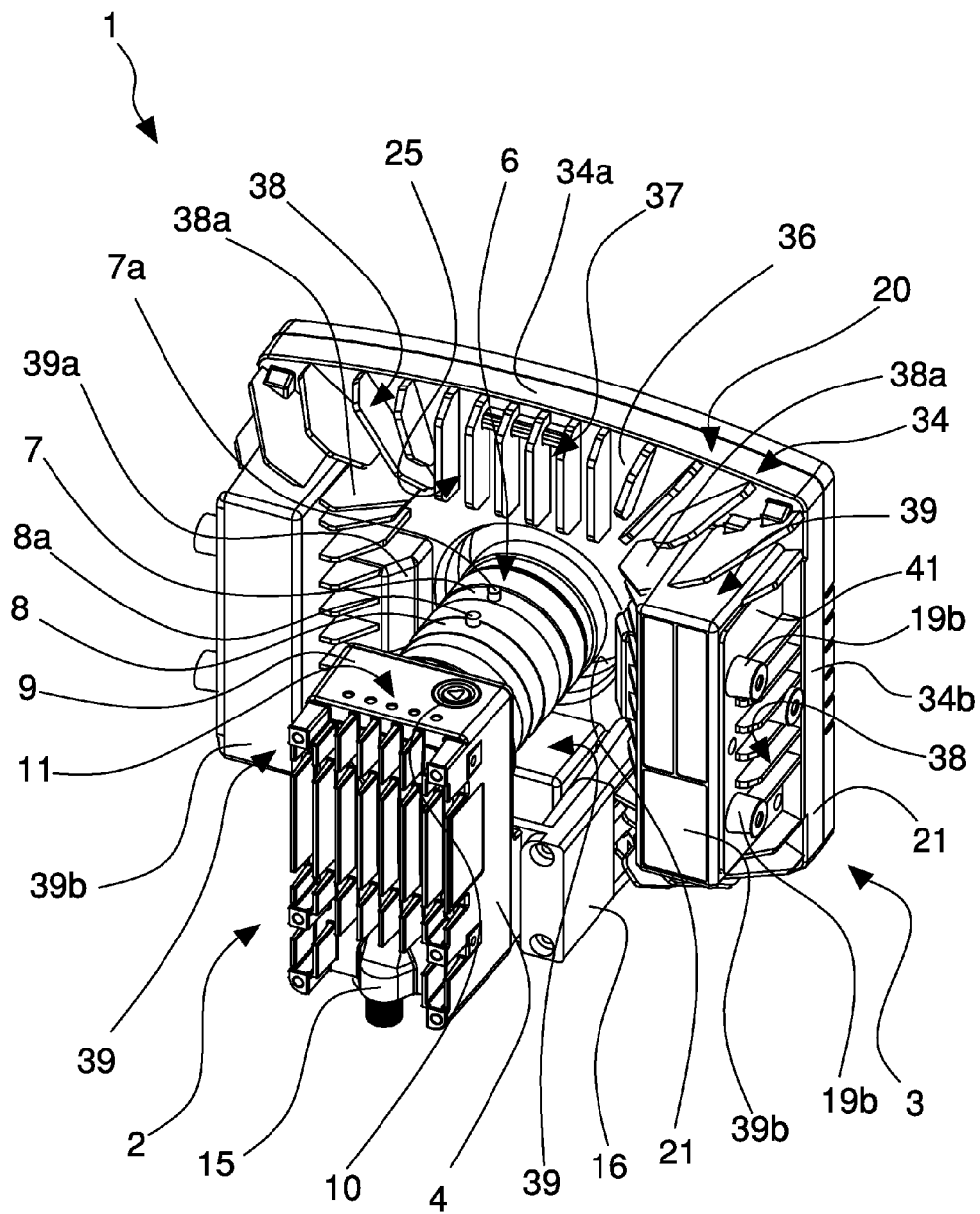
FIG. 2 shows a perspective view, on the side of preferential access to the optical means, of the image acquisition system comprising an optical apparatus and an illuminator.

With reference to FIGS. 1 and 2, an image acquisition system 1 is shown comprising an optical apparatus 2 for acquiring images of an object and an illuminator 3 associable with this apparatus 2.

The optical apparatus 2 comprises an acquisition sensor (not shown) and a control device to command the acquisition and processing of the image and also the switching on of the illuminator 3, as will be illustrated better below, which are contained in a housing body 4 of the optical apparatus 2 that is substantially parallelpipedon-shaped. To a frontal wall (not shown) of the body 4 optical means 6 (FIG. 2) is removably fixed, by means of which the sensor is able to receive the light diffused by the object to be acquired coming from a space in front of the frontal wall. The optical means 6, which is protected in use by a guard 5, which is also removably fixed to the body 4 and is shaped substantially as a beaker (FIG. 1) that substantially encapsulates the optical means 6, comprises an objective provided with at least one lens, is connectable to the body 4 by a C-MOUNT and has adjusting means comprising first focusing adjusting 7 ring nut and second ring nut 8 for adjusting the aperture of the diaphragm of the objective. Respective locking pivots 7*a* and 8*a* are associated with the ring nuts 7 and 8 to lock the ring nuts 7 and 8 in the desired adjustment position. A base wall of the protection beaker 5 is in contact with and protects the end of the optical means 6. The optical apparatus 2 further comprises a head face 9 that has an interface intended for an operator that comprises a pushbutton 10 and status indicating means 11 indicating the status of the optical apparatus 2 having five coloured LEDs.

This interface, known as X-PRESS, is suitable for configuring specific functionalities and initialising operating parameters of the optical apparatus 2 in an initial installation step of the apparatus, by selecting the duration of pressure on the pushbutton 10 and subsequent interpretation of the total set displayed by the five LEDs. In a work step of the optical apparatus 2, the status indicating means 11 on the other hand each supply a different and specific indication to the operator as follows:
a first green LED known as READY is suitable for indicating that the optical apparatus is ready for acquiring; a second green LED known as GOOD is suitable for indicating a positive reading outcome; a third yellow LED known as TRIGGER is suitable for indicating the status of the acquisition step; a fourth yellow LED known as COM is suitable for indicating that communication is active towards a serial communication system; a fifth red LED known as STATUS is suitable for indicating a negative reading outcome or alarm status of the acquisition system.

Figure 7:
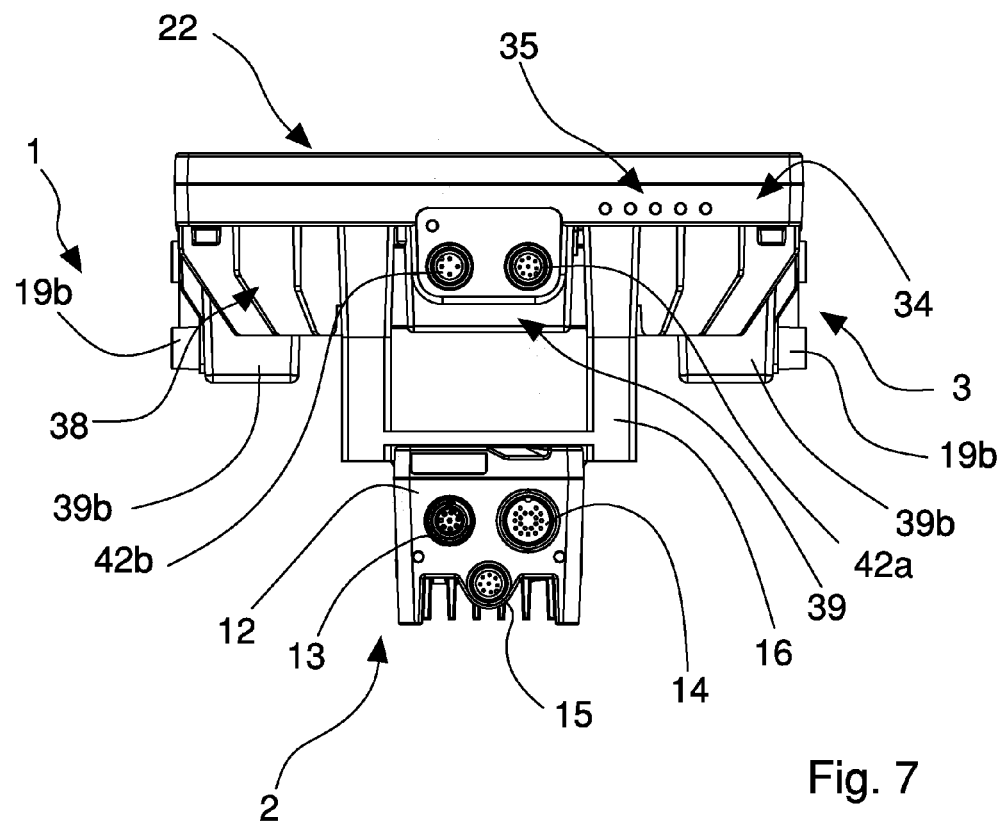
FIG. 7 shows a plan view of the illuminator in FIG. 1, on the connectors side.

A bottom face 12 of the optical apparatus 2, shown in FIGS. 1 and 7, opposite the head face 9 has three distinct communication connectors.

14 indicates a first connector by means of which the optical apparatus is connectable to a plant supply and/or to the inputs and/or to the outputs and/or to the serial communication ports of an external HOST and/or of other plant sensors. 13 indicates a second connector for connecting to an Ethernet communication network for receiving/supply data and/or commands to an external HOST controlling the optical apparatus 2. A third connector 15 obtained in a shaped recess of the bottom wall 12 is on the other hand suitable for connecting the optical apparatus to the illuminator 3 according to what is indicated better below.

The optical apparatus 2 is removably fixable to the illuminator 3 by a first connecting bracket 16 shaped, for example as a "U" or alternatively as an "H" (FIG. 1, FIG. 2 and FIG. 7), which is in turn removably connectable to the illuminator 3. The illuminator 3 is in turn removably connectable to an external point of attachment, for the final arrangement in the acquisition position by means of a second bracket 17 shaped as an "L" provided with curved slots to enable angled orientation of the acquisition system 1. The connecting bracket 16 enables fixing between the illuminator 3 and the optical apparatus 2, and substantially has the function of being a spacer between the optical apparatus 2 and the illuminator 3 and can therefore be chosen with a dimension that is such as to be adapted to the dimensions of the body 4 of the optical apparatus 2 and of the illuminator 3. The body 4 of the optical apparatus is received, when it is fixed to the illuminator 3, inside the portion of the first bracket 16 between the two perpendicular legs of parallel ends.

The illuminator 3 comprises connecting means, in particular first connecting means 19a to the first connecting bracket 16 and second connecting means 19b to the second connecting bracket 17. The first connecting means 19a consists of four female points of attachment aligned on parallel couples suitable for receiving coupling means (not shown), for example coupling screws, coupled with the first connecting bracket 16. Similar coupling means (not shown) is provided between the optical apparatus 2 and the first connecting bracket 16 for reciprocal fixing. The second connecting means 19b is made as three female points of attachment arranged at the vertices of a triangle.

Figure 6:
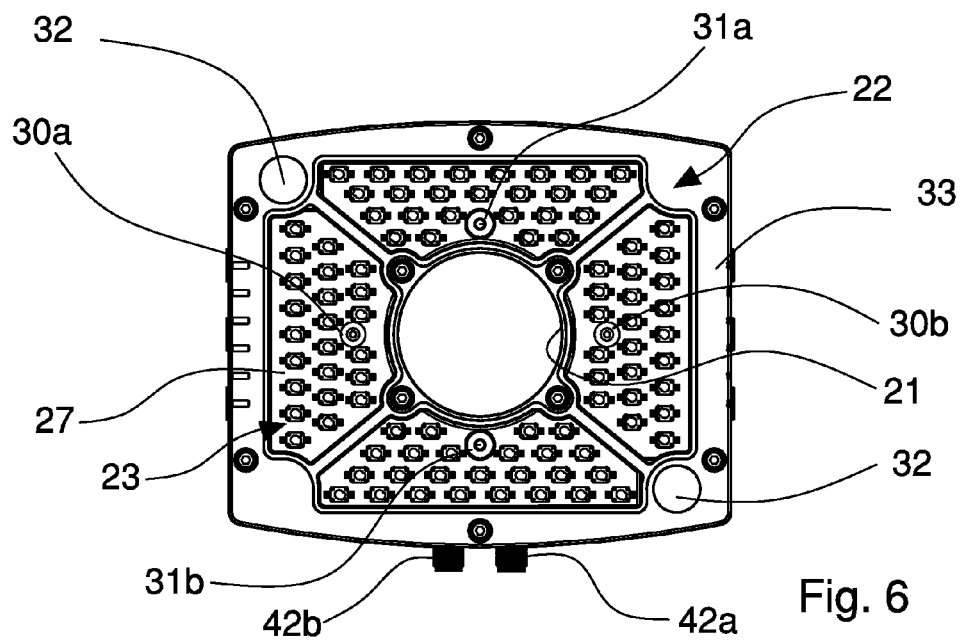
FIG. 6 shows a frontal view of a frontal face of the illuminator in FIG. 1, in which the connecting bracket connecting to the external point of attachment is not shown.

The illuminator 3, illustrated in the attached Figures, comprises a respective body 20 provided with a circular opening 21 for receiving the optical means 6 and comprising a frontal face 22 on which illuminating means 23 is arranged, shown in greater detail at least in FIG. 6, positioned around the opening 21 and commandable by the optical apparatus 2 to illuminate a space in front of the frontal face 22. The illuminating means 23 comprises a plurality of lighting elements, i.e. electronically commandable LEDs. The shown illuminator is provided with ninety-six LEDs. It is understood that the illuminator 3 can be provided with a different number of LEDs, according to the lighting required for the plane of view.

The illuminator 3 further comprises electronic control means of the illuminator, not shown, comprising control means of the illuminator and further any other device and/or electronic component necessary for the operation of the illuminating means 23 and for the control of the illuminator. In other words, the electronic control means comprises any electronic element, whether hardware or software, required to operate the illuminator.

The illuminator 3 further comprises heat dissipating means for dissipating the heat generated during operation of the illuminator 3 by the illuminating means 23 and by the electronic control means.

The body 20 further comprises a rear face 25 arranged opposite this frontal face 22, which comprises a plurality of distinct functional case elements, positioned around the opening 21, for receiving at least the electronic control means and/or which define the heat dissipating means and/or the connecting means 19a or 19b.

When the optical apparatus 2 is associated with the illuminator 3 and is fixed to the illuminator 3, the suitable arrangement of this plurality of functional case elements around the opening 21, as disclosed better below, enables the optical means 6 to be accessed to dismantle the optical means from the apparatus 2 and/or to adjust the optical adjusting means 7 and 8 of the optical means 6 without the need to dismantle the illuminator 3 from the optical apparatus 2.

The frontal face 22 of the body 20 further comprises a frontal wall 27, to which the illuminating means 23 is fixed and protection means 28, substantially a cover, of the illuminating means 23 is further fixed. A washer (not shown) is interposed between the protection means 28 and the frontal wall 27 to ensure total impermeability against solid and liquid substances at least to level IP65.

When the optical apparatus 2 and the illuminator 3 are associated to form the image acquisition system 1, the bottom wall of the protection beaker 5 of the optical means 6 is substantially coplanar with the protection means 28 of the illuminating means 23. In other configurations of the image acquisition system 1 where, with respect to what is illustrated in attached FIGS. 1 to 8, the dimensions of the optical means 6, of the protection beaker 5 and of the coupling bracket 16 can vary in proportion, it is nevertheless possible that the end of the optical means 6 protrudes or is retracted with respect to the protection means 28.

The illuminator 3 further comprises indicating means intended for an operator which is associated with the control means of the illuminator 3 according to what will be illustrated below.

The indicating means comprises aiming means, for emitting at least one luminous reference indication in the space in front of the frontal face 22 of the illuminator 3, to delimit the field of view for an operator.

The aiming means comprises a light beam emitter having an orientation established upon producing the illuminator. This emitter, arranged in a preset position of the frontal wall 27 for emitting from the frontal wall 27, is positioned below the frontal wall. For example, the orientable beam of light of the illuminator 3 can be made by means of a laser emitter. As illustrated in FIG. 6 and in FIG. 8, in a preferred embodiment of the illuminator 3, the luminous aiming means comprises a first and second laser emitter 30a and 30b that are aligned along a line passing through the centre of the opening 21 and are arranged on opposite sides of opening 21.

Figure 8:
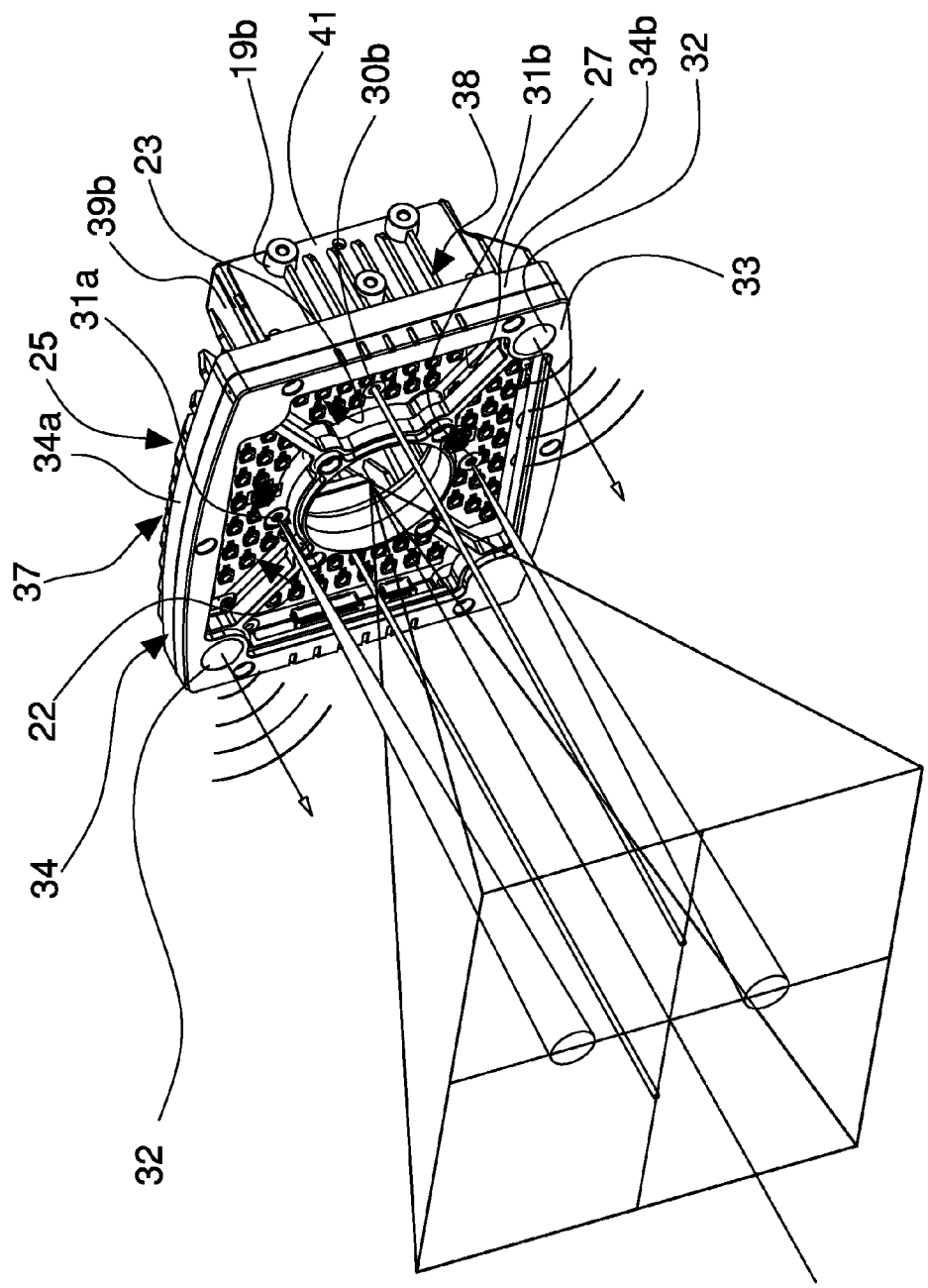
FIG. 8 shows a perspective frontal view of the illuminator in FIG. 2, in which the indicating means for an operator is active on an acquisition plane.

The laser emitting means 30a and 30b indicates to the operator during the installation and work steps of the image acquisition system 1 the acquisition field of view of the sensor of the optical apparatus 2, in particular delimiting an imaginary segment the centre of which coincides with the centre of the field of view itself, as illustrated in FIG. 8. The field of view can also be more extensive than this imaginary segment.

Luminous indicating means, for example of a reading outcome, are also arranged to emit from the frontal wall 27 and is obtained in the frontal wall 27 or positioned below frontal wall 27, and comprises a first 31a and a second 31b luminous indicator that are aligned along a line passing through the centre of the opening 21, on an opposite side to the opening 21. One of the two luminous indicators is suitable, for example, for supplying an indication that is green in colour to indicate a positive reading outcome, and i.e. that the image has been acquired successfully and that the optical information therein has been successfully decoded, the other, for example, is suitable for supplying an indication that is red in colour to indicate a negative reading outcome.

It should be noted that the alignment line of the aiming means, i.e. of the laser emitting means 30a and 30b, is perpendicular to the alignment line of the luminous indicating means, i.e. of the first and second luminous indicator 31a and 31b, such that the laser emitting means 30a and 30b and the luminous indicating means 31a and 31b are arranged at the end vertices of segments that are perpendicular to one another. The alignment lines on which the aiming means 30a and 30b, for example the laser emitters, and the luminous indicating means 31a and 31b are arranged, are perpendicular symmetry axes of the frontal face 22 of the illuminator 3 of substantially rectangular shape.

It is intended, without any restriction of scope, that the number, position and optical features of the aiming means 30a and 30b and/or of the luminous indicating means 31a and 31b present in the frontal face 22, and also the function performed thereby can be different from what has been illustrated until now. For example, a sole luminous indicator can be present, like a red spot to indicate the negative reading outcome, in normal work conditions of the acquisition system, but this luminous indicator can also indicate a malfunction in the event of unforeseen events. The meaning of the aiming means 30a and 30b and/or of the luminous indicating means 31a and 31b can in fact be configured by the control means of the illuminator 3 during operation of the illuminator 3 or be controlled by the optical apparatus 2.

The illuminator 3 further comprises acoustic indicating means, for example of reading outcome, that comprises a first acoustic indicator 32a and a second acoustic indicator 32b, which is also obtained in the frontal wall 27 or is associated therewith, which is arranged at a frame 33 of the protection means 28 on diagonally opposite vertices, for emitting into the space in front of the frontal wall 27, as shown in FIG. 8.

The body 20 of the illuminator also has a side wall 34 on which the status indicating means 35 are received indicating the status of the optical apparatus 2, which are luminous indicators that are equal in number to the status indicators 11 indicating the status of the optical apparatus 2 and are used to indicate similar status conditions. The significance of the status indicating means 35 has already been detailed previously and is not indicated here. In practice, the status indicating means 35 are five coloured LEDs that replicate the X-PRESS interface during the work step of the optical apparatus 2 and are controlled by the optical apparatus 2 according to the methods illustrated below.

The illuminator 3 further comprises diagnostic means (not shown) associated with the control means that is able to detect malfunctions of the illuminator or non-optimum operation of the illuminator 3. Such diagnostic means comprises, for example, one or more temperature sensors, distributed on the frontal wall 27 of the body 20, to measure the work temperature of the illuminating means 23 and possibly indicate non-optimum work temperatures. The diagnostic means can further comprise measuring means measuring the emission power of the illuminating means 23, for example, the diagnostic means can comprise a photoreceiver, facing a respective LED, of which the luminous power emitted is measured. The valuation of the luminous power emitted can in fact provide indications of the residual working life of the illuminator 3.

The rear face of the body 20 further comprises a rear wall 36, opposite the frontal wall 27 to which the plurality of distinct functional case elements are fixed. The side wall 34 is contiguous with the rear wall 36 and the frontal wall 27.

It should be noted that these functional case elements are distributed around the opening 21 and are conveniently spaced apart from the opening 21. Further, these elements are shaped, have rounded corners and do not have a uniform overall dimension. The overall dimension of each functional case element, the corresponding position with respect to the opening and the corresponding shape have in fact been deliberately chosen in such a manner that the rear face 25 of the body 20 comprises a concave cavity devoid of obstacles arranged at and around the opening 21, delimited by these functional case elements. The function of this cavity will be indicated better below.

Figure 3:
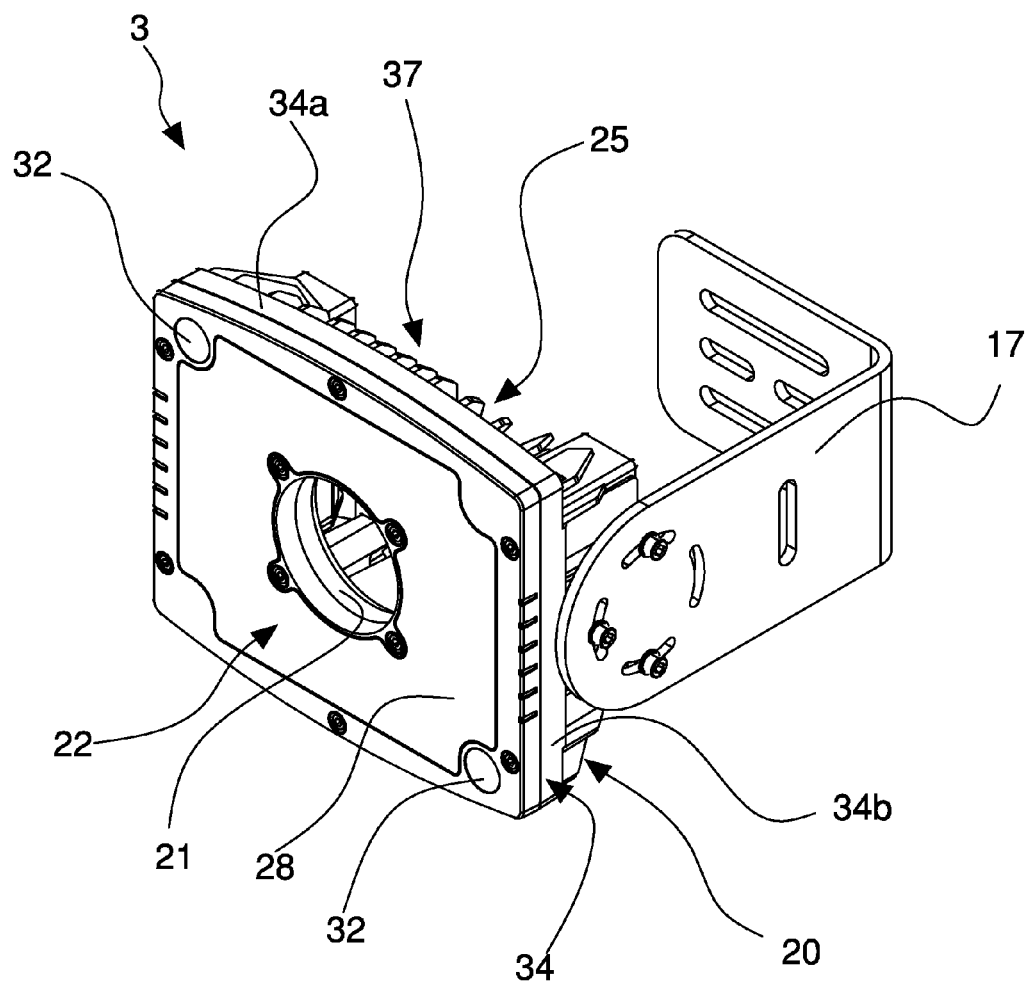
FIG. 3 shows a perspective frontal view of the illuminator, in which the connecting bracket connected to the external point of attachment is shown.
Figure 5:
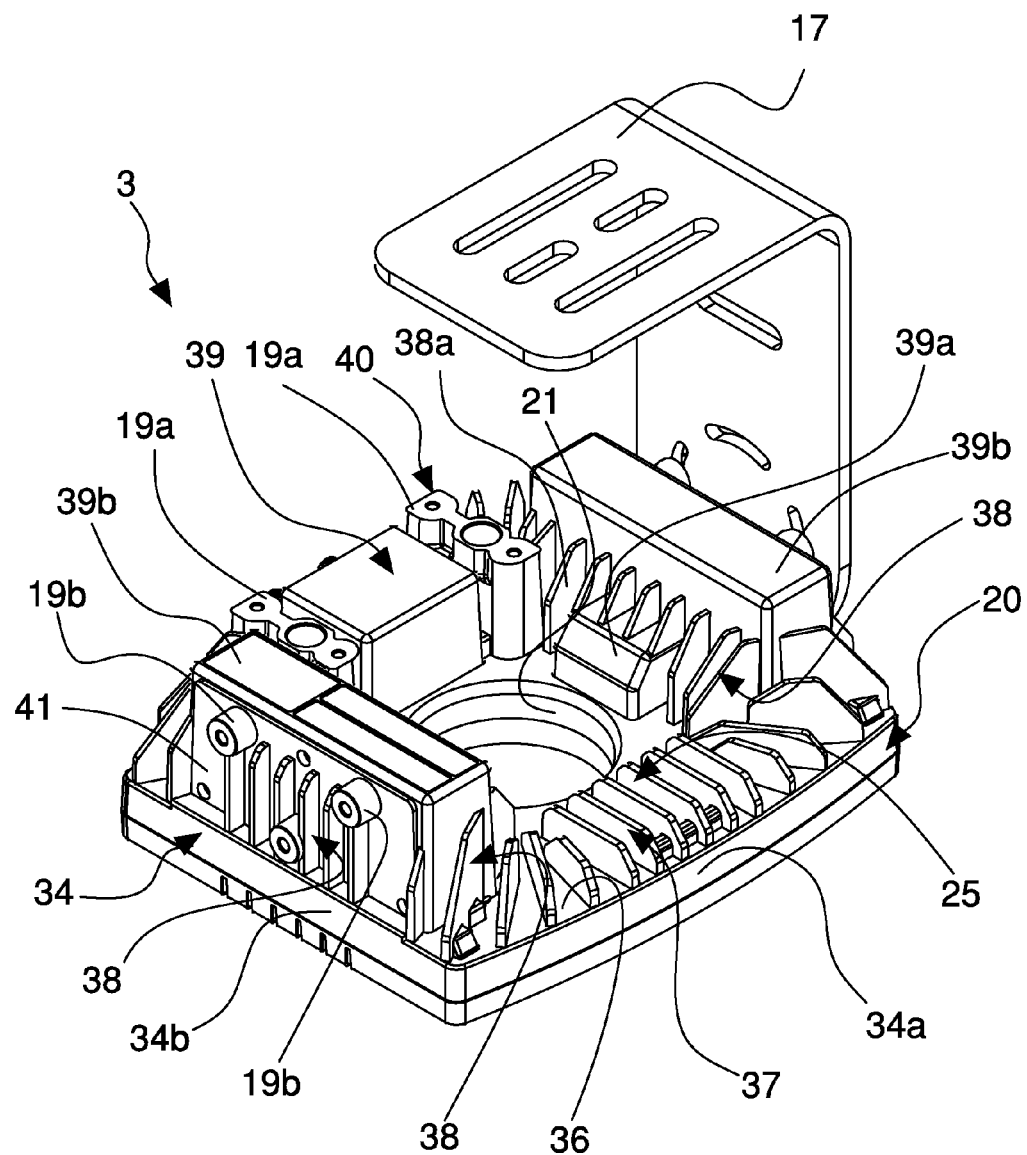
FIG. 5 shows a perspective view of the illuminator in FIG. 3, on the preferential access side to the optical means of the apparatus.

It should be noted that the functional case elements comprise a first set 37 of these elements of reduced height arranged as a fan around the opening 21, in particular of a lesser height than a preset height, illustrated at least in FIG. 3 and FIG. 5. The elements of this first set 37 are all of the same height but could also be separated into groups of different heights. The first set 37 extends in a first sector of the rear wall 36, from the opening 21 to the side wall 34 of the body 20, and occupying an entire quadrant of the rear wall 36, substantially up to the corner between the rear wall 36 and the side wall 34. This first set 37 defines a preferential lateral access portion devoid of obstacles to the optical means 6 of the optical apparatus 2.

The body 20 is substantially made as a rectangularly shaped plate having the opening 21, and the first set 37 extends as a fan until it occupies an entire corner of a greater side edge 34a of the side wall 34. It is clear that the body 20 of the illuminator can be made with plates shaped in a different manner, for example of circular or polygonal shape, and which may also not be made as a plate, but could be shaped frontally in such a manner as to be concave and have the lighting elements distributed on a concave frontal wall 27 to direct the illumination of the illuminating means 23 differently. If the body 20 is shaped as a round plate, the first set 37 will occupy a circular sector of the rear wall 36, of a given angular shape, running from the opening 21 to the corner between the rear wall 36 and the side wall 34.

Similarly, also the opening 21 can be of a different shape from the circular shape even if it is usually made in such a manner as to be coupled with the shape of the objective, which is usually cylindrical.

Figure 4:
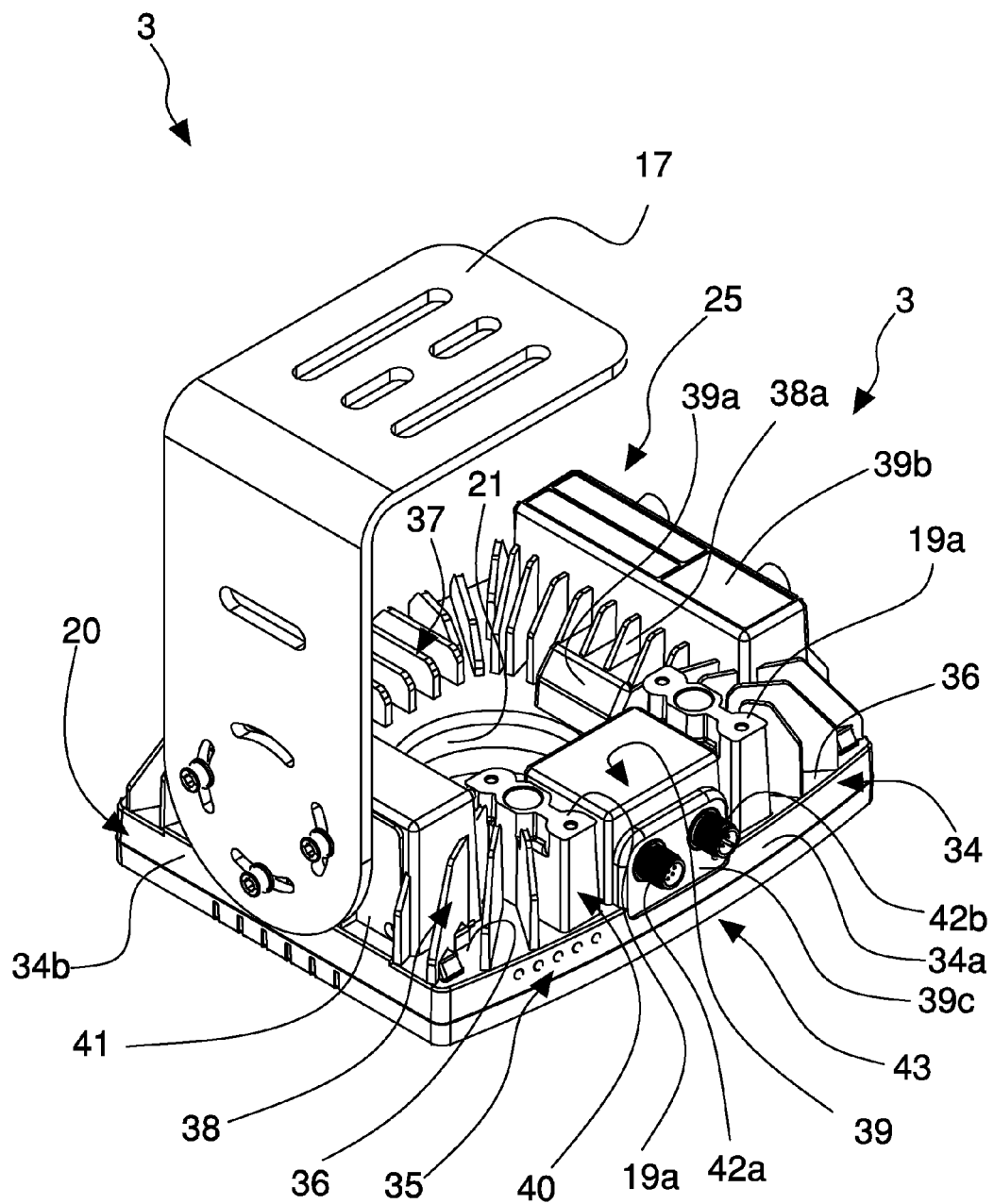
FIG. 4 shows a perspective view of the illuminator in FIG. 3, on the connectors side.

The heat dissipating means comprises a second set 38 of functional case elements and that are defined by this second set 38. In fact, the functional case elements that are part of and define the heat dissipating means are shaped heat-dissipating fins, distributed in all the quadrants of which the rear wall 36 is made. It is observed that the second set 38 of these functional case elements have some elements 38a provided with an oblique wall moving away from the opening 21 (FIG. 4). In other words, they have a wall in which the distance between the functional frame element and a axis of symmetry of the opening 21 increases moving away from the rear wall 36 along the axis of symmetry. These elements 38a having an oblique wall cooperate to delimit the concave cavity inasmuch as they leave a zone devoid of obstacles at the opening 21.

The second set 38 of functional case elements comprises the first set 37, i.e. the plurality of functional case elements that define the preferential lateral access portion 37 to the optical means 6 are dissipation fins.

The illuminator 3 further comprises containing means of the electronic control means that is defined by a third set 39 of functional case elements. The containing means of the electronic control means is substantially parallelpipedon-shaped. It is in fact noted that one element 39*a* of this third set, not of great height, extending to the opening 21, has an oblique wall in a similar way to the elements 38*a* of the second set 38 to leave also the latter a zone devoid of obstacles facing the opening and delimit the concave cavity (FIG. 4).

Other elements 39*b* of this third set on the other hand has a much greater height than the elements of the first set 37 and are for this positioned in portions of the rear wall 36 as far away as possible from the opening 21, in particular they extend along a portion of the corner between the rear wall 36 and the side wall 34, as externally as possible with respect to the central opening 21 (FIG. 2, FIG. 4 and FIG. 5).

In particular, a first and a second element of great height are positioned opposite the opening 21 along opposite edges between the rear wall and lesser side edges 34*b* of the side wall 34 of the body 20.

It has been said that the illuminator comprises connecting means 19*a* and 19*b* for removably connecting the illuminator to the optical apparatus 2 and/or to an external point of attachment. A fourth set 40 of functional case elements comprises the connecting means 19*a* and 19*b*, which are defined by the fourth set 40. In other words, the fourth set 40 comprises all the functional case elements that have the function of acting as a mechanical support for other elements, for example of the first set 37, second set 38 or third set 39, or have the function of connecting to the optical apparatus 2 and/or to an external point of attachment. The fourth set 40 further comprises a first and second thin rectangular plate 41, shown at least in FIG. 1. Each plate 41 is substantially orthogonal to the rear wall 36 and is superimposed on the element 39*b* of great height of the third set 39, towards the lesser side wall 34 of the body 20, for fixing respective connecting means 19*b*.

It should be noted that the fixing means 19*a* for fixing to the optical apparatus is positioned in a second sector of the rear wall 36 (FIG. 1, FIG. 4 and FIG. 5), in particular in a quadrant diametrically opposite the quadrant in which the functional case elements of the first set 37 are present that make the preferential lateral access portion to the optical means 6. In this manner the sector of the rear wall 36 in which the access to the optical means 6 is impossible, is opposite the preferential access portion.

The illuminator 3 further comprises connector means shown at least in FIGS. 4 and 7, one connector 42*a* of which being a communication connector between the illuminator 2 and the optical apparatus 2 and a further connector 42*b* supplies the illuminator 3. One containing element 39*c* of the third set is associated with and supports the connector means 42*a* and 42*b*. This element 39*c* is arranged perpendicular to the rear wall 36, along the further greater side edge 34*a* of the side wall 34 opposite the greater side edge on which the preferential lateral access portion 37 extends. The illuminator thus comprises a bottom face 43 which the connector means 42*a* and 42*b* faces.

In this manner an illuminator 3 for an image acquisition system 1 is provided that has a body 20 comprising an illuminating frontal face 22 and a rear face 25 opposite the frontal face 22 in which 1*a* rear face 25 comprises a plurality of distinct functional case elements, that are distributed around the opening 21 with which the body 20 is provided and spaced apart from the opening 21, are shaped in a suitable manner and are of a suitable height, and are able to receive the electronic and/or mechanical management components and/or define the heat dissipating means that is most advantageous for enabling an operator to have access without obstacles to the optical means of the optical apparatus 2 when the latter is connected to the illuminator 3.

Further, by providing the illuminator with a first set 37 of these functional case elements of reduced height, it is possible to define a sector of the body 20 of the illuminator 3 that constitutes a preferential access side/zone to the objective. The concave cavity at the opening 21 delimited by the functional case elements, devoid of obstacles, enables the hand of the operator to be received when the latter grasps, for screwing or unscrewing, either the protection beaker 5 of the optical means 6 or the optical means 6 of the optical apparatus 2.

The electronic control means of the illuminator 3 comprises control means and communication means associated with the control means to exchange data with, and/or receive commands from, the optical apparatus 2 relating to information stored and/or measured by the illuminator 3 and/or an indication intended for the operator by the set of the indicating means with which the illuminator is provided.

As said previously, the indicating means can comprise the aiming means 30*a* and 30*b*, for example laser emitting means for emitting reference indication of a field of view and/or the luminous indicating means 31*a* and 31*b*, for example of positive and/or negative reading outcome, the acoustic indicating means 32, for example of positive reading outcome, and/or luminous status indicating means 35 of the optical apparatus 2.

The communication means, on the other hand, comprises the first connector 42*a* connecting to the optical apparatus 2, which is an eight-pole connector.

There are two luminous indicating means, one indicating a good reading outcome 31*a* and the other indicating a bad reading outcome 31*b*, each is commandable individually. For this purpose, each luminous indicator is commandable by a respective digital signal that is receivable in a contact of the communication connector 42*a*. A first and a second contact of the communication connector 42*a* are thus provided for receiving a first and a second digital signal.

The aiming means 30*a* and 30*b* is on the other hand simultaneously commandable and the command is receivable via a respective digital signal in a respective contact of the communication connector 42*a*. A third digital signal is thus provided for being received in a third contact of the communication connector 42*a*.

Similarly, switching on of the illuminating means 23 is commandable by a respective digital signal receivable in a respective contact of the communication connector 42*a*. A fourth digital signal is thus receivable in a fourth contact of the communication connector 42*a*, to command the switch-on of the plurality of lighting elements with which the illuminating means 23 is provided.

It is observed that the illuminator 3 can comprise illuminating means 23 that comprises a plurality of lighting elements that are groupable in a preset number of sets, in particular at least two sets and preferably at least four sets. In this case, it is possible to command each set of grouped lighting elements to switch on separately, as illustrated better below.

The communication means comprises in fact a communication network in which there is provided a communication protocol between the illuminator 3 and the optical apparatus 2 by means of which the illuminator 3 is able to receive commands from, and/or exchange data with, the optical apparatus and which enables the illuminator 3 to have additional functions, including that of interface for an operator.

By means of the communication network, the illuminator 3 is further able to supply a digital datum or complex information data stored in its control means to the optical apparatus 2 or to receive a complex command from the optical apparatus 2. A complex command comprises, for example, both a command code, i.e. it is associable to the command to be run, and complex information data, for example a data structure that contains several elementary data, for example parameter values that are settable in the illuminator 3.

Switch-on of each set of grouped lighting elements is commandable separately by a respective command that is receivable in the communication network. A first command from the apparatus 2 to the illuminator 3 is aimed at switching on the grouped lighting elements.

Also the light intensity of the lighting elements 23, the acoustic indicating means 32, the luminous status indicating means 35 is commandable individually by respective commands receivable in the communication network. A second, a third, a fourth command are thus respectively receivable in the communication network to command a light intensity value of the lighting elements, for the acoustic indicating means 32 and for the luminous status indicating means 35.

The illuminator 3 is further able to supply a piece of stored information, for example it can supply identification of the version of the illuminator by a respective command, i.e. a fifth command, receivable in the communication network.

The version of the illuminator is usable by the optical apparatus 2 to recognise the type of illuminator 3 associated with the optical apparatus 2 in an initial configuration step of the optical apparatus and accordingly adapt its functions to those of the illuminator 3 in relation to the type of version.

The optical apparatus 2 can further obtain the diagnosis data from the diagnosis means present in the illuminator by means of a respective command, which the illuminator 3 is able to receive from the communication network. A sixth command is provided in the communication network, to obtain the diagnostic information detected or processed by the diagnosis means of the illuminator 3, such as the temperature measured by each temperature sensor with which the illuminator is provided.

It is observed that the command with which the optical apparatus 2 supplies the light intensity value to the illuminator or configures the LEDs indicating status 35, is a complex command that comprises both the command code and a complex data structure and it is a "WRITE" command. Otherwise, the command with which the optical apparatus 2 requests the version of the illuminator 3 and/or the diagnosis values is a "READ" command in which the data structure is received.

The communication network for the optical apparatus 2 is made by means of a fifth and sixth contact of the communication connector 42a, by means of which a serial BUS I2C can be made. The control means of the illuminator 3 can be made by a microcontroller connected to the BUS I2C, or be more simply distributed control components I2C of the indicating means distributed to the operator. A seventh and eighth contact of the connector 42a are supply contacts to the optical apparatus 2. The illuminator 3, supplied by the connector 42b, is thus in turn able to supply the optical apparatus 2 without further need to supply the optical apparatus 2 by a suitable cable that is connectable to first connector 14.

It is pointed out that the communication means between the optical apparatus 2 and the illuminator 3 can be of a different type from what has been so far illustrated. A different communication network from BUS I2C can be provided and thus the digital signals for commanding, for example, the switch-on of the illuminating means 23 and/or the aiming means 30a and 30b and/or the luminous indicators 31a and 31b may not be present, replaced by corresponding commands in the different communication network.

In use, the image acquisition system 1 is assembled preliminarily.

The objective 6 is screwed and clamped in the final position to the body 4 of the optical apparatus 2 and subsequently the protection beaker 5 is screwed on the body 4.

The optical apparatus 2 is subsequently fixed to the first bracket 16, in turn fixed to the illuminator 3 and lastly the second bracket 17 is fixed to the external point of attachment. An eight-pole cable 44 is set up between the third connector 15 of the optical apparatus and the communication connector 42a of the illuminator. The illuminator 3, supplied by the external plant power line by the supply connector 42b, in turn supplies the optical apparatus 2. The Ethernet is connected to the optical apparatus 2 by a network cable set up on the second connector 13.

It is observed that a preliminary configuration step of the optical apparatus 2 provides a check of the version received from the illuminator 3 by means of the respective command, the fifth, transmitted on the BUS I2C and consequent adjustment of the functions of the optical apparatus 2 to the illuminator 3, for example for simplified versions of illuminators 3 for which acoustic indicating means and/or, for example, the laser emitters are not provided. At the end of this preliminary step, the optical apparatus is ready for the diaphragm and focusing adjusting step.

During this diaphragm and focusing adjusting step, an operator can easily access the optical means 6, after the protection beaker 5 has been unscrewed, from the preferential access portion 37 of the illuminator 3. Further, the operator is also able to perform adjustments on the ring nuts 7 or 8, inasmuch as the concave cavity delimited by the functional case elements is of such dimensions as not only to receive a hand of the operator but also to enable this hand to be rotated when the optical means 6 is grasped. The rear face 25 of the device thus has an ergonomic arrangement of the functional case elements, the rounded corners of which and the oblique walls 38a and 39a of which do not hinder rotation of the hand of the operator. Access to the optical means 6 is thus permitted, also in an overall very compact acquisition system.

As illustrated in FIG. 8, the optical apparatus 2 is able to provide the operator with indications relating to the operation of the apparatus 2 during the work step. The illuminating means 23 is thus activated at each image acquisition, by placing the fourth digital signal at a high logic value and the laser emitting means 30a and 30b can also be activated, by placing the digital signal at a high logic value when the field of view has to be indicated to the operator. If the acquisition of the image is successful, the optical apparatus 2 places the first digital signal at a high logic value to show the green spot positive reading outcome through the luminous indicator 31a, otherwise it puts the second digital signal at a high logic value to control the switching on of the red spot negative reading outcome, by means of the luminous indicator 31b. In the event of a good reading, also the acoustic indicating means 32 is activated by the respective command, the third, to the illuminator 3 on the communication network and the status indicating means 35 to replicate the X-PRESS interface, transmitting the fourth command to the illuminator 3.

It is observed that the variation in the switch-on frequency of the luminous indicators 31a and/or 31b and/or of the acoustic indicating means 32 can be advantageously used by an operator in a configuration step following a variation in the adjustment of the optical means 6. As focusing the image can be identified by suitable processing of the acquired image by the processing software in the optical apparatus 2, an additional indication intended for an operator is possible.

By means of the respective command of the activation communication network of the acoustic indicating means 32, in particular the fourth command, and the first and second digital signal activating the luminous indicators 31a and/or 31b, it is possible for the optical apparatus 2 to communicate to an operator that the focusing adjustment of the optical means 6 has been completed. For example, an unfocused acquired image can be communicated to an operator by activating the luminous indicators 31a and 31b and the low-frequency acoustic signal 32 and the activation frequency could increase as the operator, by acting on the focusing ring nut 7a, improves the focus of the acquired image. In this manner, by providing the illuminator with the indicating means intended for an operator and with control means for controlling these indicating means that is connectable by communication means to the optical apparatus 2 and is commandable thereby, it is possible to indicate appropriately to the operator both the field of view of the optical apparatus and the positive or negative reading outcome. These indicators have a power that is suitable for being detected, even if the image acquisition system is positioned at a distance from the operator.

Further, owing to the communication network for exchanging data and/or commands with the optical apparatus 2, it is possible to form a complex command to illuminate only one part of the lighting elements constituting the illuminating means or vary intensity or also switch-on frequency. By further associating the activation frequency of the luminous indicators 31a and/or 31b and/or of the acoustic signal 32 of the illuminator 3 with the fact that the acquired image is or is not focused, the illuminator 3 of the present invention provides the operator with information on the reading outcome, and on the focusing of the acquired image, that does not require the presence of a screen of an interface device for an operator.

Owing to the illuminator 3 of the present invention it is thus possible not only to replace and/or access the optical means in order to adjust the optical means when the image acquisition system is positioned and oriented during the work step, but facilitated adjustment of the focusing is possible that does not require instrumentation in addition to the illuminator 3.

The illuminator 3 that is thus obtained has functions that enable the configuration and adjusting time of the acquisition system to be reduced in which the illuminator is installed.

What is claimed is:

1. An illuminator for an image acquisition system, the image acquisition system comprising an optical apparatus for acquiring images of an object, said optical apparatus being provided with optical means and said illuminator being associable with said optical apparatus; wherein said illuminator comprises:

a body provided with an opening, for receiving said optical means;

illuminating means arranged around said opening in a frontal face of said body and commandable by said optical apparatus to illuminate a space in front of said frontal face;

electronic control means of said illuminator;

heat dissipating means;

connecting means for removably fixing said illuminator at least to said optical apparatus;

wherein said body comprises a rear face opposite said frontal face which comprises a plurality of distinct functional case elements positioned around said opening for receiving at least said electronic control means or which defines said heat dissipating means armor said connecting means, in such a manner as to enable an operator when said optical apparatus is associated with said illuminator, to access said optical means to dismantle said optical means from said optical apparatus or adjust optical adjusting means of said optical means, wherein said rear face comprises a concave cavity devoid of obstacles arranged at, and around, said opening, said cavity being delimited by said functional case elements, wherein said illuminating means is fixed to a frontal wall of said frontal face, and wherein said illuminator comprises protection means protecting said illuminating means, which is also fixed to said frontal wall, and wherein said illuminator comprises aiming means for emitting at least a reference indication of a field of view to an operator, said aiming means being arranged for emitting light from said frontal wall, and wherein said aiming means comprises at least a first light emitting means for emitting a first light emitting beam having a preset orientation.

2. The illuminator according to claim 1, wherein said aiming means comprises at least a second light emitting means for emitting at least a second light emitting beam having a preset orientation, said first and said second light emitting means being aligned along a line passing through the center of said opening and arranged on an opposite side to said opening.

3. The illuminator according to claim 1, and comprising luminous status indicating means of said illuminator, said luminous status indicating means being obtained in a side wall of said body.

4. The illuminator according claim 1, wherein said rear face comprises a rear wall, said plurality of distinct functional case elements, in particular shaped and having rounded corners, being connected to, or fixed to, said rear wall conveniently spaced apart from or distributed with respect to said opening.

5. An illuminator for an image acquisition system, the image acquisition system comprising an optical apparatus for acquiring images of an object, said optical apparatus being provided with optical means and said illuminator being associable with said optical apparatus; wherein said illuminator comprises:

a body provided with an opening, for receiving said optical means;

illuminating means arranged around said opening in a frontal face of said body and commandable by said optical apparatus to illuminate a space in front of said frontal face;

electronic control means of said illuminator;

heat dissipating means;

connecting means for removably fixing said illuminator at least to said optical apparatus;

wherein said body comprises a rear face opposite said frontal face which comprises a plurality of distinct functional case elements positioned around said opening for receiving at least said electronic control means or which defines said heat dissipating means or said connecting means, in such a manner as to enable an operator when said optical apparatus is associated with said illuminator, to access said optical means to dismantle said optical means from said apparatus or adjust optical adjusting means of said optical means, wherein said rear face comprises a rear wall, said plurality of distinct functional case elements, in particular shaped and having rounded corners, being connected to, or fixed to, said rear wall conveniently spaced apart from or distributed with respect to said opening, and wherein the illuminator comprises a first set of said functional case elements, of reduced height, in particular less than a preset height, arranged in a first sector of said rear wall between said opening and a side wall of said body to define a preferential lateral access portion devoid of obstacles to said optical means.

6. The illuminator according to claim 5, wherein said body is substantially a rectangularly shaped plate, said first sector extending over an entire greater side edge of said side wall.

7. The illuminator according to claim 5, wherein said heat dissipating means is defined by a second set of said functional case elements.

8. The illuminator according to claim 7, wherein at least one element of said second set has an oblique wall moving away from said opening, wherein the distance between said at least one element and an axis of symmetry of said opening increases moving away from said rear wall along said axis of symmetry.

9. The illuminator according to claim 7, wherein said second set comprises said first set.

10. The illuminator according to claim 7, and further comprising containing means of said electronic control means, defined by a third set of said functional case elements.

11. The illuminator according to claim 10, wherein said body is substantially a rectangularly shaped plate, at least one element of said third set being arranged and extending along an entire lesser side edge of a side wall of said body.

12. The illuminator according to claim 10, wherein said connecting means is suitable for removably connecting said illuminator to said optical apparatus or to an external point of attachment, and wherein said connecting means is defined by a fourth set of functional case elements.

13. The illuminator according to claim 12, wherein at least one element of said fourth set is arranged and extends along at least a portion of a lesser side edge of a side wall of said body.

14. The illuminator according to claim 13, wherein at least one element of said fourth set for fixing to said optical apparatus is positioned in a second sector of said rear wall, diametrically opposite said first sector with respect to said opening.

15. The illuminator according to claim 10, and further comprising connector means for the communication between said illuminator and said optical apparatus and further containing means of said third set associated with said connector means.

16. The illuminator according to claim 15, wherein said further containing means is arranged in a position opposite said preferential lateral access portion, in particular along a greater side edge of said side wall.

17. An image acquisition system comprising an optical apparatus for acquiring images of an object, and an illuminator according to claim 1.

18. An illuminator for an image acquisition system, the image acquisition system comprising an optical apparatus for acquiring images of an object, said optical apparatus being provided with optical means and said illuminator being associable with said optical apparatus; wherein said illuminator comprises:

a body provided with an opening, for receiving said optical means;

illuminating means arranged around said opening in a frontal face of said body and a switching on of which is commandable by said optical apparatus to illuminate a space in front of said frontal face;

wherein said illuminator comprises indicating means intended for an operator, control means for controlling said indicating means and communication means associated with said control means for exchanging data with or receiving commands from, said optical apparatus relating to information stored in, or measured by said illuminator or an indication to be supplied to said operator by said indicating means, wherein said indicating means comprises aiming means for emitting at least one indication of a field of view or luminous indicating means or acoustic indicating means of positive reading outcome or luminous status indicating means of said optical apparatus, wherein said aiming means comprises a first light emitting means for emitting a first light emitting beam having a first preset orientation or a second light emitting means for emitting a second light emitting beam having a second preset orientation, or wherein said luminous indicating means comprises a first indicator of positive reading outcome or a second indicator of negative reading outcome, and wherein said communication means comprises communication connector means for connecting to said optical apparatus, said indicating means indicating positive reading outcome or negative reading outcome being commandable by respective digital signals receivable in respective contacts of said communication connector means, in particular by a first digital signal and a second digital signal that are respectively receivable in a first contact and a second contact of said communication connector means.

19. The illuminator according to claim 18, wherein said communication means comprises communication connector means for connecting to said optical apparatus, said aiming means being commandable by a respective digital signal that is receivable in a respective contact of said connector means, in particular by a third digital signal that is receivable in a third contact of said communication connector means.

20. The illuminator according to claim 19, wherein said communication means comprises communication connector means for connecting to said optical apparatus, said switching on of said illuminating means being commandable by a respective digital signal receivable in a respective contact of said communication connector means, in particular by a fourth digital signal receivable in a fourth contact of said communication connector means.

21. The illuminator according to claim 18, wherein said communication means comprises a communication network, by means of which said illuminator is able to receive commands from or exchange data with said optical apparatus, and in particular is able to exchange a digital datum or complex information data stored in or measured by, said control means for controlling said illuminator.

22. The illuminator according to claim 21, wherein said information stored in said illuminator comprises a version of said illuminator stored in said control means, said version being acquirable by said optical apparatus in said communication network by a respective command receivable in said communication network.

23. The illuminator according to claim 21, and comprising diagnosis means of said illuminator, and wherein said complex information data is a diagnosis information measured or processed by said diagnosis means, said diagnosis information being acquirable by said optical apparatus in said communication network by a respective command receivable in said communication network.

24. An image acquisition system, comprising an optical apparatus for acquiring images of an object, and an illuminator according to claim 18.

25. An illuminator for an image acquisition system, the image acquisition system comprising an optical apparatus for acquiring images of an object, said optical apparatus being provided with optical means and said illuminator being associable with said optical apparatus; wherein said illuminator comprises:
- a body provided with an opening, for receiving said optical means;
- illuminating means arranged around said opening in a frontal face of said body and commandable by said optical apparatus to illuminate a space in front of said frontal face;
- electronic control means of said illuminator;
- heat dissipating means;
- connecting means for removably fixing said illuminator at least to said optical apparatus;
- wherein said body comprises a rear face opposite said frontal face which comprises a plurality of distinct functional case elements positioned around said opening for receiving at least said electronic control means or which defines said heat dissipating means or said connecting means, in such a manner as to enable an operator when said optical apparatus is associated with said illuminator, to access said optical means to dismantle said optical means from said apparatus or adjust optical adjusting means of said optical means,
- wherein said illuminating means is fixed to a frontal wall of said frontal face, and wherein said illuminator comprises protection means protecting said illuminating means, which is also fixed to said frontal wall,
- wherein said illuminator further comprises luminous indicating means to an operator, said luminous indicating means being arranged for emitting from, and being obtained in said frontal wall, and wherein said luminous indicating means comprises at least a first luminous indicator,
- wherein said luminous indicating means comprises a second luminous indicator, said first and said second luminous indicator being aligned along a line passing through the center of said opening and being arranged on opposite sides of said opening,
- wherein said illuminator further comprises aiming means, said aiming means comprising first light emitting means for emitting a first light emitting beam having a preset orientation,
- wherein said aiming means comprises at least second light emitting means for emitting at least a second light emitting beam having a preset orientation, said first and said second light emitting means being aligned along a line passing through the center of said opening and arranged on an opposite side to said opening, and
- wherein said alignment line of said first light emitting beam and of said second light emitting beam is perpendicular to the alignment line of said first luminous indicator and of said second luminous indicator.

26. An illuminator for an image acquisition system, the image acquisition system comprising an optical apparatus for acquiring images of an object, said optical apparatus being provided with optical means and said illuminator being associable with said optical apparatus; wherein said illuminator comprises:
- a body provided with an opening, for receiving said optical means;
- illuminating means arranged around said opening in a frontal face of said body and commandable by said optical apparatus to illuminate a space in front of said frontal face;
- electronic control means of said illuminator;
- heat dissipating means;
- connecting means for removably fixing said illuminator at least to said optical apparatus;
- wherein said body comprises a rear face opposite said frontal face which comprises a plurality of distinct functional case elements positioned around said opening for receiving at least said electronic control means or which defines said heat dissipating means or said connecting means, in such a manner as to enable an operator when said optical apparatus is associated with said illuminator, to access said optical means to dismantle said optical means from said apparatus or adjust optical adjusting means of said optical means,
- wherein said illuminating means is fixed to a frontal wall of said frontal face, and wherein said illuminator comprises protection means protecting said illuminating means, which is also fixed to said frontal wall, and
- wherein the illuminator comprises acoustic indicating means of reading outcome, said acoustic indicating means being obtained in said frontal wall and being arranged at a frame of said protection means.

27. An illuminator for an image acquisition system, the image acquisition system comprising an optical apparatus for acquiring images of an object, said optical apparatus being provided with optical means and said illuminator being associable with said optical apparatus; wherein said illuminator comprises:
- a body provided with an opening, for receiving said optical means;
- illuminating means arranged around said opening in a frontal face of said body and a switching on of which is commandable by said optical apparatus to illuminate a space in front of said frontal face;
- wherein said illuminator comprises indicating means intended for an operator, control means for controlling said indicating means and communication means associated with said control means for exchanging data with or receiving commands from, said optical apparatus relating to information stored in, or measured by said illuminator or an indication to be supplied to said operator by said indicating means,
- wherein said communication means comprises a communication network, by means of which said illuminator is able to receive commands from or exchange data with said optical apparatus, and in particular is able to exchange a digital datum or complex data structure stored in or measured by, said control means for controlling said illuminator, wherein said switching on of each of said sets is commandable separately by a respective command, in particular a first command that is receivable in said communication network, wherein a light intensity of said lighting elements is commandable by a respective command, in particular a second command, receivable in said communication network, wherein said indicating means comprises aiming means for emitting at least one indication of a field of view or luminous indicating means or acoustic indicating means of positive reading outcome or luminous status indicating means of said optical apparatus, wherein said acoustic indicating means is commandable by a respective command receivable in said communication network, in particular a third command, or said luminous status indicating means is commandable by a respective command that is receivable in said communication network, in particular a fourth command.

28. An illuminator for an image acquisition system, the image acquisition system comprising an optical apparatus for acquiring images of an object, said optical apparatus being provided with optical means and said illuminator being associable with said optical apparatus; wherein said illuminator comprises:

a body provided with an opening, for receiving said optical means;

illuminating means arranged around said opening in a frontal face of said body and a switching on of which is commandable by said optical apparatus to illuminate a space in front of said frontal face;

wherein said illuminator comprises indicating means intended for an operator, control means for controlling said indicating means and communication means associated with said control means for exchanging data with or receiving commands from, said optical apparatus relating to information stored in, or measured by said illuminator or an indication to be supplied to said operator by said indicating means, wherein said communication means comprises a communication network, by means of which said illuminator is able to receive commands from or exchange data with said optical apparatus, and in particular is able to exchange a digital datum or complex information data stored in or measured by, said control means for controlling said illuminator, and wherein the illuminator comprises diagnosis means of said illuminator, and wherein said complex information data is a diagnosis information measured or processed by said diagnosis means, said diagnosis information being acquirable by said optical apparatus in said communication network by a respective command receivable in said communication network.

29. An illuminator for an image acquisition system, the image acquisition system comprising an optical apparatus for acquiring images of an object, said optical apparatus being provided with optical means and said illuminator being associable with said optical apparatus; wherein said illuminator comprises:

a body provided with an opening, for receiving said optical means;

illuminating means arranged around said opening in a frontal face of said body and commandable by said optical apparatus to illuminate a space in front of said frontal face;

electronic control means of said illuminator;

heat dissipating means;

connecting means for removably fixing said illuminator at least to said optical apparatus;

wherein said body comprises a rear face opposite said frontal face which comprises a plurality of distinct functional case elements positioned around said opening for receiving at least said electronic control means or which defines said heat dissipating means or said connecting means, in such a manner as to enable an operator when said optical apparatus is associated with said illuminator, to access said optical means to dismantle said optical means from said optical apparatus or adjust optical adjusting means of said optical means, wherein said rear face comprises a concave cavity devoid of obstacles arranged at, and around, said opening, said cavity being delimited by said functional case elements, wherein said illuminating means is fixed to a frontal wall of said frontal face, and wherein said illuminator comprises protection means protecting said illuminating means, which is also fixed to said frontal wall, and wherein the illuminator comprises luminous indicating means to an operator, said luminous indicating means being arranged for emitting from, and being obtained in said frontal wall, and wherein said luminous indicating means comprises at least a first luminous indicator.

30. The illuminator according to claim 29, wherein said luminous indicating means comprises a second luminous indicator, said first and said second luminous indicator being aligned along a line passing through the center of said opening and being arranged on opposite sides of said opening.

31. The illuminator according to claim 30, wherein a light intensity of said lighting elements is commandable by a respective command, in particular a second command, receivable in said communication network.

32. An illuminator for an image acquisition system, the image acquisition system comprising an optical apparatus for acquiring images of an object, said optical apparatus being provided with optical means and said illuminator being associable with said optical apparatus; wherein said illuminator comprises:

a body provided with an opening, for receiving said optical means;

illuminating means arranged around said opening in a frontal face of said body and commandable by said optical apparatus to illuminate a space in front of said frontal face;

electronic control means of said illuminator;

heat dissipating means;

connecting means for removably fixing said illuminator at least to said optical apparatus;

wherein said body comprises a rear face opposite said frontal face which comprises a plurality of distinct functional case elements positioned around said opening for receiving at least said electronic control means or which defines said heat dissipating means or said connecting means, in such a manner as to enable an operator when said optical apparatus is associated with said illuminator, to access said optical means to dismantle said optical means from said optical apparatus or adjust optical adjusting means of said optical means, wherein said rear face comprises a concave cavity devoid of obstacles arranged at, and around, said opening, said cavity being delimited by said functional case elements, wherein said illuminating means is fixed to a frontal wall of said frontal face, and wherein said illuminator comprises protection means protecting said illuminating means, which is also fixed to said frontal wall, and wherein the illuminator comprises acoustic indicating means of reading outcome, said acoustic indicating means being obtained in said frontal wall and being arranged at a frame of said protection means.

33. An illuminator for an image acquisition system, the image acquisition system comprising an optical apparatus for acquiring images of an object, said optical apparatus being provided with optical means and said illuminator being associable with said optical apparatus; wherein said illuminator comprises:

a body provided with an opening, for receiving said optical means;

illuminating means arranged around said opening in a frontal face of said body and a switching on of which is commandable by said optical apparatus to illuminate a space in front of said frontal face;

wherein said illuminator comprises indicating means intended for an operator, control means for controlling said indicating means and communication means associated with said control means for exchanging data with or receiving commands from, said optical apparatus relating to information stored in, or measured by said illuminator or an indication to be supplied to said operator by said indicating means, wherein said indicating means comprises aiming means for emitting at least one indication of a field of view or luminous indicating means or acoustic indicating means of positive reading outcome or luminous status indicating means of said optical apparatus, wherein said aiming means comprises a first light emitting means for emitting a first light emitting beam having a first preset orientation or a second light emitting means for emitting a second light emitting beam having a second preset orientation, or wherein said luminous indicating means comprises a first indicator of positive reading outcome or a second indicator of negative reading outcome, and wherein said illuminating means comprises a plurality of lighting elements that are groupable in a preset number of sets, in particular at least two sets, said switching on of each set being commandable separately.

34. An illuminator for an image acquisition system, the image acquisition system comprising an optical apparatus for acquiring images of an object, said optical apparatus being provided with optical means and said illuminator being associable with said optical apparatus; wherein said illuminator comprises:

a body provided with an opening, for receiving said optical means;

illuminating means arranged around said opening in a frontal face of said body and a switching on of which is commandable by said optical apparatus to illuminate a space in front of said frontal face;

wherein said illuminator comprises indicating means intended for an operator, control means for controlling said indicating means and communication means associated with said control means for exchanging data with or receiving commands from, said optical apparatus relating to information stored in, or measured by said illuminator or an indication to be supplied to said operator by said indicating means, wherein said indicating means comprises aiming means for emitting at least one indication of a field of view or luminous indicating means or acoustic indicating means of positive reading outcome or luminous status indicating means of said optical apparatus, wherein said aiming means comprises a first light emitting means for emitting a first light emitting beam having a first preset orientation or a second light emitting means for emitting a second light emitting beam having a second preset orientation, or wherein said luminous indicating means comprises a first indicator of positive reading outcome or a second indicator of negative reading outcome, wherein said communication means comprises a communication network, by means of which said illuminator is able to receive commands from or exchange data with said optical apparatus, and in particular is able to exchange a digital datum or complex information data stored in or measured by, said control means for controlling said illuminator, and wherein said switching on of each of said sets is commandable separately by a respective command, in particular a first command that is receivable in said communication network.

35. The illuminator according to claim 34, wherein a light intensity of said lighting elements is commandable by a respective command, in particular a second command, receivable in said communication network.

36. The illuminator according to claim 35, wherein said acoustic indicating means is commandable by a respective command receivable in said communication network, in particular a third command, or said luminous status indicating means is commandable by a respective command that is receivable in said communication network, in particular a fourth command.

37. The illuminator according to claim 34, wherein said communication means comprises communication connector means for connecting to said optical apparatus, said communication network, being makable by two contacts of said communication connector means.

38. An illuminator for an image acquisition system, the image acquisition system comprising an optical apparatus for acquiring images of an object, said optical apparatus being provided with optical means and said illuminator being associable with said optical apparatus; wherein said illuminator comprises:

a body provided with an opening, for receiving said optical means;

illuminating means arranged around said opening in a frontal face of said body and a switching on of which is commandable by said optical apparatus to illuminate a space in front of said frontal face;

wherein said illuminator comprises indicating means intended for an operator, control means for controlling said indicating means and communication means associated with said control means for exchanging data with or receiving commands from, said optical apparatus relating to information stored in, or measured by said illuminator or an indication to be supplied to said operator by said indicating means, wherein said indicating means comprises aiming means for emitting at least one indication of a field of view or luminous indicating means or acoustic indicating means of positive reading outcome or luminous status indicating means of said optical apparatus, wherein said aiming means comprises a first light emitting means for emitting a first light emitting beam having a first preset orientation or a second light emitting means for emitting a second light emitting beam having a second preset orientation, or wherein said luminous indicating means comprises a first indicator of positive reading outcome or a second indicator of negative reading outcome, wherein said communication means comprises a communication network, by means of which said illuminator is able to receive commands from or exchange data with said optical apparatus, and in particular is able to exchange a digital datum or complex information data stored in or measured by, said control means for controlling said illuminator, and wherein said information stored in said illuminator comprises a version of said illuminator stored in said control means, said version being acquirable by said optical apparatus in said communication network by a respective command receivable in said communication network.

39. An illuminator for an image acquisition system, the image acquisition system comprising an optical apparatus for acquiring images of an object, said optical apparatus being provided with optical means and said illuminator being associable with said optical apparatus; wherein said illuminator comprises:
- a body provided with an opening, for receiving said optical means;
- illuminating means arranged around said opening in a frontal face of said body and a switching on of which is commandable by said optical apparatus to illuminate a space in front of said frontal face;
- wherein said illuminator comprises indicating means intended for an operator, control means for controlling said indicating means and communication means associated with said control means for exchanging data with or receiving commands from, said optical apparatus relating to information stored in, or measured by said illuminator or an indication to be supplied to said operator by said indicating means, wherein said indicating means comprises aiming means for emitting at least one indication of a field of view or luminous indicating means or acoustic indicating means of positive reading outcome or luminous status indicating means of said optical apparatus, wherein said aiming means comprises a first light emitting means for emitting a first light emitting beam having a first preset orientation or a second light emitting means for emitting a second light emitting beam having a second preset orientation, or wherein said luminous indicating means comprises a first indicator of positive reading outcome or a second indicator of negative reading outcome, wherein said communication means comprises a communication network, by means of which said illuminator is able to receive commands from or exchange data with said optical apparatus, and in particular is able to exchange a digital datum or complex information data stored in or measured by, said control means for controlling said illuminator, and wherein the illuminator comprises diagnosis means of said illuminator, and wherein said complex information data is a diagnosis information measured or processed by said diagnosis means, said diagnosis information being acquirable by said optical apparatus in said communication network by a respective command receivable in said communication network.

* * * * *

UNITED STATES PATENT AND TRADEMARK OFFICE
CERTIFICATE OF CORRECTION

| | |
|---|---|
| PATENT NO. | : 9,894,256 B2 |
| APPLICATION NO. | : 14/359173 |
| DATED | : February 13, 2018 |
| INVENTOR(S) | : Liberatore et al. |

It is certified that error appears in the above-identified patent and that said Letters Patent is hereby corrected as shown below:

In the Claims

In Claim 1, at Column 16, Line 16: delete --"armor"-- and substitute therefor --"or"--.

In Claim 4, at Column 16, Line 51: delete --"comers"-- and substitute therefor --"corners"--.

In Claim 5, at Column 17, Line 11: insert --"optical"-- after the word --"said"-- and before the word --"apparatus"--.

In Claim 25, at Column 19, Line 45: insert --"optical"-- after the word --"said"-- and before the word --"apparatus"--.

In Claim 26, at Column 20, Line 33: insert --"optical"-- after the word --"said"-- and before the word --"apparatus"--.

In Claim 31, at Column 22, Line 34: delete incorrect claim language --"The illuminator according to claim 30, wherein a light intensity of said lighting elements is commandable by a respective command, in particular a second command, receivable in said communication network."-- and substitute therefor with correct claim language
--"The illuminator according to claim 30, and comprising aiming means for emitting at least a reference indication of a field of view to an operator, said aiming means being arranged for emitting light from said frontal wall, and wherein said aiming means comprises at least a first light emitting means for emitting a first light emitting beam having a preset orientation,
wherein said aiming means comprises at least a second light emitting means for emitting at least a second light emitting beam having a preset orientation, said first and said second light emitting means being aligned along a line passing through the center of said opening and arranged on an opposite side to said opening,
wherein said alignment line of said first light emitting beam and of said second light emitting beam is perpendicular to the alignment line of said first luminous indicator and of said second luminous indicator."--.

Signed and Sealed this
Tenth Day of April, 2018

Andrei Iancu
*Director of the United States Patent and Trademark Office*